(12) United States Patent
Cohen et al.

(10) Patent No.: US 10,591,837 B2
(45) Date of Patent: Mar. 17, 2020

(54) SECURITY LIQUID ELECTROSTATIC INK COMPOSITION

(71) Applicant: HP Indigo B.V., Amstelveen (NL)

(72) Inventors: Haim Cohen, Nes Ziona (IL); Yaron Grinwald, Nes Ziona (IL); Gideon Amir, Nes Ziona (IL); Reut Avigdor, Nes Ziona (IL); Julia Kornilov, Nes Ziona (IL)

(73) Assignee: HP Indigo B.V., Amstelveen (NL)

(*) Notice: Subject to any disclaimer, the term of this patent is extended or adjusted under 35 U.S.C. 154(b) by 0 days.

(21) Appl. No.: 16/066,145

(22) PCT Filed: Mar. 4, 2016

(86) PCT No.: PCT/EP2016/054648
§ 371 (c)(1),
(2) Date: Jun. 26, 2018

(87) PCT Pub. No.: WO2017/148533
PCT Pub. Date: Sep. 8, 2017

(65) Prior Publication Data
US 2019/0018334 A1 Jan. 17, 2019

(51) Int. Cl.
*G03G 9/12* (2006.01)
*C09D 11/50* (2014.01)
*C09D 11/52* (2014.01)
*B41M 3/14* (2006.01)
*G03G 9/135* (2006.01)

(52) U.S. Cl.
CPC ............ *G03G 9/122* (2013.01); *C09D 11/50* (2013.01); *C09D 11/52* (2013.01); *G03G 9/12* (2013.01); *B41M 3/14* (2013.01); *G03G 9/135* (2013.01); *G03G 2215/00932* (2013.01)

(58) Field of Classification Search
CPC .... G03G 9/0902; G03G 9/0926; G03G 9/122; G03G 13/10; G03G 2215/00932
See application file for complete search history.

(56) References Cited

U.S. PATENT DOCUMENTS

| | | | |
|---|---|---|---|
| 4,948,978 A * | 8/1990 | Guyot | G01T 1/2018 250/367 |
| 5,759,729 A | 6/1998 | Martin et al. | |
| 5,916,718 A | 6/1999 | Kellie et al. | |
| 7,087,354 B2 | 8/2006 | Nakamura et al. | |
| 7,252,360 B2 | 8/2007 | Hersch et al. | |
| 8,404,424 B2 | 3/2013 | Schulze-Hagenest et al. | |
| 9,244,389 B2 | 1/2016 | Sandler et al. | |
| 2002/0041372 A1 | 4/2002 | Gardner et al. | |
| 2005/0069656 A1 * | 3/2005 | Nakane | B41M 5/0356 428/32.61 |
| 2007/0194248 A1 * | 8/2007 | Belov | C09K 11/7701 250/458.1 |
| 2008/0198446 A1 * | 8/2008 | Asakura | G02B 5/208 359/352 |
| 2008/0233313 A1 * | 9/2008 | Chatow | B41M 5/0023 428/30 |
| 2009/0035711 A1 * | 2/2009 | Niwa | F02P 23/02 431/267 |
| 2009/0082196 A1 * | 3/2009 | Tanaka | B01J 21/063 502/170 |
| 2011/0111336 A1 | 5/2011 | Gore | |
| 2012/0261617 A1 * | 10/2012 | Pan | C09K 11/602 252/301.6 R |
| 2012/0327362 A1 * | 12/2012 | Doraiswamy | G02B 1/043 351/159.24 |
| 2013/0224643 A1 * | 8/2013 | Takamiya | G03G 9/081 430/108.6 |
| 2015/0005393 A1 * | 1/2015 | Abiko | C09C 1/0021 514/770 |
| 2016/0102216 A1 * | 4/2016 | Hirade | C09D 11/326 524/413 |
| 2017/0076469 A1 * | 3/2017 | Sonoura | G06K 9/4604 |
| 2017/0146671 A1 * | 5/2017 | Shigeta | G01T 1/20 |
| 2017/0241908 A1 * | 8/2017 | Feke | G01J 1/58 |
| 2018/0017509 A1 * | 1/2018 | Pfeiffer | G06F 21/73 |

FOREIGN PATENT DOCUMENTS

| | | | | |
|---|---|---|---|---|
| EP | 0646631 | 4/1995 | | |
| EP | 0829454 | 3/1998 | | |
| EP | 2077468 | 7/2009 | | |
| GB | 2258659 | 2/1993 | | |
| GB | 2396355 | 6/2004 | | |
| JP | 2002146254 | 5/2002 | | |
| WO | WO-2008065085 A1 * | 6/2008 | ............ | C09D 5/22 |
| WO | WO-2015110173 A1 * | 7/2015 | ............ | G03G 9/122 |
| WO | WO-2015110174 A1 * | 7/2015 | ............ | G03G 9/135 |
| WO | WO-2015113606 A1 * | 8/2015 | ............ | C09D 11/03 |
| WO | 2015156766 | 10/2015 | | |

OTHER PUBLICATIONS

Donegan, J.F.; Bergin, F.J.; Glynn, T.J.; Imbusch, G.F.; Remeika, J.P. "The Optical Spectroscopy of LiGa5O8:Ni2+". Journal of Luminescence 35 (1986), pp. 57-63.*

Kuleshev, N.V.; Shcherbitskii, V.G.; Mikhailov, V.P.; Guretskii, S.A.; Lugients, A.M.; Milovanov, A.S.; Dunina, E.B.; Hartung, S.; Huber, G. "Spectroscopic Properties of LiGa5O8 Single Crystals Doped with Chromium"; Optics and Spectroscopy 84 (1998), pp. 865-869.*

International Search Report dated Apr. 21, 2016 for PCT/EP2016/054648, Applicant Hewlett-Packard Indigo B.V.

* cited by examiner

*Primary Examiner* — Christopher D Rodee
(74) *Attorney, Agent, or Firm* — HP Inc. Patent Department (57) ABSTRACT

Described herein is a security LEP ink composition comprising an absorber, a resin; and a carrier liquid for printing a security image.

11 Claims, 1 Drawing Sheet

SECURITY LIQUID ELECTROSTATIC INK COMPOSITION

BACKGROUND

Electrophotographic printing processes, sometimes termed electrostatic printing processes, generally involve creating an image on a photoconductive surface, applying an ink having charged particles to the photoconductive surface, such that they selectively bind to the image, and then transferring the charged particles in the form of the image to a print substrate.

The photoconductive surface may be on a cylinder and is often termed a photo imaging plate (PIP). The photoconductive surface is selectively charged with a latent electrostatic image having image and background areas with different potentials. For example, an electrostatic ink composition including charged particles in a liquid carrier can be brought into contact with the selectively charged photoconductive surface. The charged particles adhere to the image areas of the latent image while the background areas remain clean. The image is then transferred to a print substrate (e.g. paper) directly or, by being first transferred to an intermediate transfer member, which can be a soft swelling blanket, which is often heated to fuse the solid image and evaporate the liquid carrier, and then to the print substrate.

DETAILED DESCRIPTION

Figure 1:
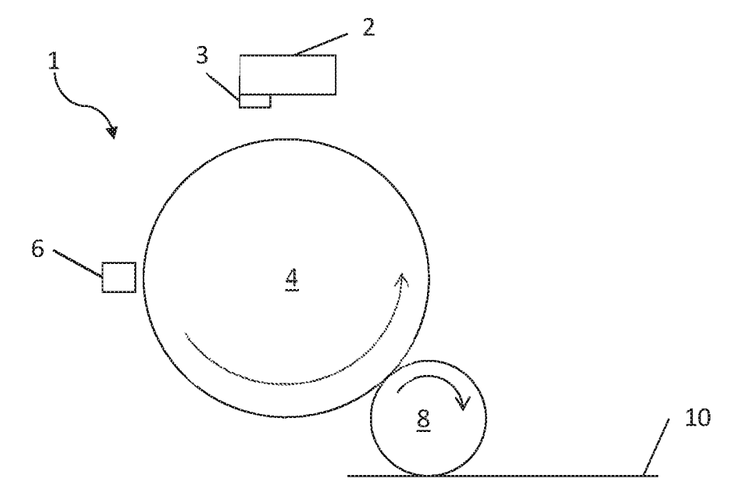
The FIGURE is a schematic illustration of an example of a Liquid Electro Photographic (LEP) printing apparatus for printing an electrostatic ink composition.

Before the compositions, methods and related aspects of the disclosure are disclosed and described, it is to be understood that this disclosure is not restricted to the particular process features and materials disclosed herein because such process features and materials may vary somewhat. It is also to be understood that the terminology used herein is used for the purpose of describing particular examples. The scope of the invention is defined by the appended claims and equivalents thereof.

It is noted that, as used in this specification and the appended claims, the singular forms "a," "an," and "the" include plural referents unless the context clearly dictates otherwise.

As used herein, "liquid carrier", "carrier," or "carrier vehicle" refers to the fluid in which the polymer resin, absorber(s), charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to an ink composition, which may be in liquid form, generally suitable for use in an electrostatic printing process, sometimes termed an electrophotographic printing process. The electrostatic ink composition may include chargeable particles of the resin and an absorber(s) dispersed in a liquid carrier, which may be as described herein.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components of the electrostatic composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise. In some examples, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "liquid electrostatic(ally) printing" or "liquid electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "liquid electrophotographic printers" or "liquid electrostatic printers" generally refer to those printers capable of performing electrophotographic printing or electrostatic printing, as described above. A liquid electrophotographic (LEP) printing process may involve subjecting a liquid electrophotographic ink composition to an electric field, e.g. an electric field having a field strength of 1000 V/cm or more, in some examples 1000 V/mm or more.

As used herein, "LEP image" or "printed LEP image" refers to an image which has been printed, e.g. on a print substrate, by liquid electrophotographically printing a LEP ink composition described herein.

As used herein, the term "about" is used to provide flexibility to a numerical range endpoint by providing that a given value may be a little above or a little below the endpoint. The degree of flexibility of this term can be dictated by the particular variable.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also to include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, unless specified otherwise, wt % values are to be taken as referring to a weight-for-weight (w/w) percentage of solids in the ink composition, and not including the weight of any carrier fluid present.

As used herein "infrared light", "infrared radiation", "IR light" or "IR radiation" refers to light having a wavelength in the range of about 700 nm to about 10000 nm.

As used herein "ultraviolet light", "ultraviolet radiation", "UV light" or "UV radiation" refers to light having a wavelength in the range of about 100 nm to about 400 nm.

As used herein "visible light" or "visible radiation" refers to light having a wavelength in the range of about 400 nm to about 700 nm.

As used herein "radiation" may be used to refer to infrared light, ultraviolet light or visible light.

The terms "light" and "radiation" can be used interchangeably.

As used herein "optical signal" refers to the reflection and/or emission spectrum provided by a particular component (e.g. an absorber) on exposure to radiation (for example a particular range of radiation, such as IR, visible or UV light, or particular ranges of IR, visible or UV wavelengths). For example, if an absorber absorbs and emits light (e.g. IR, UV and/or visible light) the optical signal of the absorber is the superposition of the absorber's reflectance and emission spectra on exposure to radiation (e.g. a selected range of radiation). If a LEP ink composition contains a plurality of absorbers, the optical signal for the LEP ink composition, or LEP image printed from the LEP ink composition, is formed by the superposition of the reflectance and/or emission spectra of each of the absorbers contained in the LEP ink composition or LEP image.

Unless otherwise stated, any feature described herein can be combined with any aspect or any other feature described herein.

In one aspect there is provided a security liquid electrophotographic (LEP) ink composition. The security LEP ink may comprise:
an absorber;
a resin; and
a carrier liquid,
wherein the LEP ink is colourless and transparent.

In another aspect there is provided a method for providing a security LEP ink composition. The method may comprise:
selecting an absorber; and
combining the absorber with a resin and a carrier liquid,
wherein the LEP ink is colourless and transparent and detectable at a selected optical signal.

In another aspect there is proved a method for printing security information. The method may comprise:
providing a security LEP ink composition comprising:
an absorber;
a resin; and
a carrier liquid; and
liquid electrophotographically printing the selected LEP ink onto a print substrate to provide a LEP image on the print substrate which is invisible to the human eye.

The present inventors have found that a LEP ink composition can be provided which is invisible to the human eye, for example transparent and colourless, when exposed to radiation (e.g. ultraviolet, visible or infrared light), but detectable so as to be useful in security applications. The inventors have also found that the LEP ink composition may be selected in order to provide a printed LEP image which is detectable at a pre-selected optical signal and/or intensity when exposed to radiation.

Liquid Electrophotographic (LEP) Ink Composition

Described herein is a security LEP ink composition comprising an absorber, a resin; and a carrier liquid for printing a security image.

The LEP ink composition described herein may be a security LEP ink composition, for example, a LEP ink composition which is, or a LEP ink composition which may be printed to form a LEP image which is, colourless and detectable on exposure to radiation (for example IR, visible or UV light, in some examples IR or UV light), for example detectable at a particular optical signal, in some examples detectable at a particular optical signal and/or intensity. The LEP ink composition or a printed LEP image may be detectable on exposure to radiation and at the same time invisible to the human eye. For example, the LEP ink composition or LEP printed image may be colourless, in some examples transparent and colourless, such that the human eye cannot see an image printed using the LEP ink composition. In some examples, a LEP image printed using the LEP ink composition is invisible to the human eye when printed on any print substrate described herein, for example paper, e.g. white paper, when viewed under IR, visible (for example natural daylight or electric lighting, such as fluorescent lighting) or UV light. In some examples, the LEP ink composition is colourless and transparent such that a printed LEP image, for example a printed LEP image having a thickness of less than 10 pm, for example less than 5 μm, less than 4 μm, less than 3 μm, less than 2 μm, or less than 1 μm is invisible to the human eye.

As used herein "invisible to the human eye" may mean that a naked human eye (i.e. a human eye alone, e.g. in the absence of additional detection means) cannot see a LEP image printed using the LEP ink composition. In some examples, a LEP image is invisible to the human eye if the eye cannot see a LEP image printed using the LEP ink composition on any print substrate, for example print substrates described herein, such as paper or white paper. In some examples, a LEP image is invisible to the human eye if the eye cannot see a LEP image printed using the LEP ink composition on any print substrate such that the image has a thickness of 5 µm or less, for example 4 µm or less, 3 µm or less, 2 µm or less, or 1 µm or less. In some examples, a LEP image is invisible to the human eye if the image is transparent and colourless.

In some examples, a LEP image or LEP ink composition may be considered to be colourless if a printed LEP image does not substantially contribute a subtractive or additive effect on the colour of any print substrate (for example, where the colour of the print substrate is determined by the wavelength of light within the range of about 400 to about 700 nm reflected and/or emitted from the print substrate) on which the LEP image may be printed. For example, a LEP image or LEP ink composition may not substantially contribute to a subtractive or additive effect on the colour of any print substrate as long as any visible light provided by the LEP image or LEP ink composition on exposure to radiation (e.g. IR, UV or visible light, in some examples on illumination with visible light) is not visible to (for example not detectable by) the human eye. For example, a LEP image or LEP ink composition may not substantially contribute to a subtractive or additive effect on the colour of any print substrate as long as any visible light provided by the LEP image or LEP ink composition on exposure to radiation (e.g. IR, UV or visible light, in some examples on illumination with visible light) is of an intensity relative to ambient visible light such that any visible light provided by the LEP image is of an intensity less than about 0.5% of the intensity of ambient light, for example less than about 0.1%, less than about 0.05%, less than about 0.01%, less than about 0.005%, less than about 0.001%, less than about 0.0005%, less than about 0.0001%, less than about 0.00005%, less than about 0.00001%, less than about 0.000005%, or less than about 0.000001% of the intensity of ambient light.

As used herein "visible light provided by the LEP image or LEP ink composition" may refer to any visible light emitted by the LEP ink composition or LEP image on exposure to IR, UV or visible light (in some examples, on exposure to visible light) and/or any absorption of visible light by the LEP image or LEP ink composition causing reflection of coloured visible light from the LEP image or the LEP ink composition. For example, if the LEP image or LEP ink composition absorbs visible light, the LEP image or LEP ink composition may only absorb visible light to an extent that reflected visible light from the LEP image or LEP ink composition having a different wavelength (coloured light) to ambient light (including visible light to which the image or ink is exposed and reflected and/or emitted visible light from the print substrate, or e.g. a receptacle in which the LEP ink composition may be held) has an intensity such that coloured light reflected by the LEP image or LEP ink composition, following absorption of visible light, cannot be seen by the human eye (for example the reflected coloured light has an intensity of less than about 0.5% of the intensity of ambient light, for example less than about 0.1%, less than about 0.05%, less than about 0.01%, less than about 0.005%, less than about 0.001%, less than about 0.0005%, less than about 0.0001%, less than about 0.00005%, less than about 0.00001%, less than about 0.000005%, or less than about 0.000001% of the intensity of ambient light).

For example, the LEP ink or a LEP image may be colourless, or transparent and colourless, for example colourless when viewed under visible, UV or IR light. In some examples, a colourless LEP ink composition or a LEP image is a LEP ink composition or a LEP image which does not absorb or emit visible light (i.e. light having a wavelength of about 400 to about 700 nm). A colourless LEP ink composition may be one that is free from pigment. A colourless LEP ink composition or LEP image may be one that does not contribute a subtractive effect on the colour of any print substrate on which the security LEP ink composition may be printed. A colourless and transparent LEP ink composition, or LEP image, may be invisible to the human eye when viewed under visible light or light having a UV or IR wavelength.

In some examples, a colourless LEP ink composition or LEP image may be one that emits no visible light or emits visible light to an extent that any visible light emitted has an intensity less than about 0.1% of the intensity of ambient light, for example less than about 0.05%, less than about 0.01%, less than about 0.005%, less than about 0.001%, less than about 0.0005%, less than about 0.0001%, less than about 0.00005%, less than about 0.00001%, less than about 0.000005%, or less than about 0.000001% of the intensity of ambient light. In some examples, a colourless LEP ink composition or LEP image may be one that absorbs no visible light or only absorbs visible light to the extent that coloured visible light (i.e. light of a different wavelength and therefore colour to light which is reflected by, for example, a substrate on which the LEP image is printed, a substrate on which the LEP ink composition is deposited or a receptacle in which a LEP ink composition is held) reflected from the LEP ink composition or LEP image has an intensity less than about 0.1% of the intensity of ambient light, for example less than about 0.05%, less than about 0.01%, less than about 0.005%, less than about 0.001%, less than about 0.0005%, less than about 0.0001%, less than about 0.00005%, less than about 0.00001%, less than about 0.000005%, or less than about 0.000001% of the intensity of ambient light. In some examples, a colourless LEP ink composition or LEP image may be one that emits and/or absorbs no visible light, or only emits or absorbs visible light to an extent that any visible light emitted, or any visible light reflected due to absorption of visible light has an intensity less than about 0.1% of the intensity of ambient light, for example less than about 0.05%, less than about 0.01%, less than about 0.005%, less than about 0.001%, less than about 0.0005%, less than about 0.0001%, less than about 0.00005%, less than about 0.00001%, less than about 0.000005%, or less than about 0.000001% of the intensity of ambient light.

The LEP ink composition or LEP image may be transparent. A LEP ink composition or LEP image may be considered to be transparent if the LEP ink composition or LEP image allows substantially all visible light incident on the LEP ink composition or LEP image to be transmitted through the LEP image or LEP ink composition. A LEP ink composition or LEP image may be considered to be transparent if the LEP ink composition or LEP image allows at least about 60%, for example at least about 70%, at least about 80%, at least about 90%, at least about 95%, at least about 98%, at least about 99%, at least about 99.5%, at least about 99.95% of visible light incident on the LEP image or LEP ink composition to be transmitted through the LEP image or LEP ink composition.

Absorber

The liquid electrophotographic (LEP) ink, e.g. security ink, comprises an absorber, e.g. at least a first absorber.

An absorber is a component that absorbs radiation, for example infrared (IR) light, visible light and/or ultraviolet (UV) light. In some examples, an absorber may also emit radiation (e.g. the absorber may also be an emitter), for example infrared (IR) light, visible light and/or ultraviolet (UV) light. As described above, emitted visible light may be invisible to a human eye.

In some examples, the absorber may be an absorber which absorbs IR light and emits IR light. In some examples, an absorber which absorbs IR light also emits IR light but emits no or substantially no UV or visible light. In some examples, an absorber which absorbs UV light also emits UV light. In some examples, an absorber which absorbs UV light also emits UV light but emits no or substantially no IR or visible light. In some examples, an absorber which absorbs visible light also emits visible light.

In some examples, an absorber may comprise or consist of an IR/UV absorber, for example an absorber which absorbs IR and/or UV light. In some examples, an IR/UV absorber absorbs IR and/or UV light but does not substantially absorb or emit visible light, for example is not visible to the human eye, or is colourless, for example does not absorb or emit visible light. In some examples, an IR/UV absorber may emit IR and/or UV light.

In some examples an absorber may comprise or consist of an IR absorber, for example an absorber which absorbs IR light. In some examples, an IR absorber absorbs IR light but does not substantially absorb or emit visible light, for example is not visible to the human eye, or is colourless, for example does not absorb or emit visible light. In some examples an IR absorber may emit IR light. In some examples, an IR absorber absorbs IR light over a particular range of wavelengths and reflects and/or emits IR light having a particular optical signal. The optical signal may be the reflectance spectrum of the IR absorber following absorbance of the particular range of wavelengths, or a combination of the reflectance spectrum and the emission spectrum of the IR absorber following absorbance of the particular range of wavelengths. In some examples, the optical signal may be the emission spectrum of the IR absorber following absorbance of the particular range of wavelengths. In some examples the optical signal may be a peak reflection and/or emission wavelength or peak reflection and/or emission wavelengths.

In some examples an absorber may comprise or consist of an UV absorber, for example an absorber which absorbs UV light. In some examples, an UV absorber absorbs UV light but does not substantially absorb or emit visible light, for example is not visible to the human eye, or is colourless, for example does not absorb or emit visible light. In some examples an UV absorber may emit UV light. In some examples, an UV absorber absorbs UV light having a particular range of wavelengths and reflects and/or emits UV light having a particular optical signal. The optical signal may be the reflectance spectrum of the UV absorber following absorbance of the particular range of wavelengths, or a combination of the reflectance spectrum and the emission spectrum of the UV absorber following absorbance of the particular range of wavelengths. In some examples, the optical signal may be the emission spectrum of the UV absorber following absorbance of the particular range of wavelengths. In some examples the optical signal may be a peak reflection and/or emission wavelength or peak reflection and/or emission wavelengths.

As used herein, the terms "IR/UV absorber", "IR absorber" and "UV absorber" are used to refer to a component that does not substantially absorb light having a wavelength within the visible spectrum, i.e. does not substantially absorb light having a wavelength in the range 400 nm to 700 nm. Therefore, an IR/UV absorber, an IR absorber or an UV absorber is not visible to the human eye when viewed under visible light. An IR/UV absorber, an IR absorber or a UV absorber may not be visible to the human eye even when viewed under UV or IR light. For example, an IR/UV absorber, an IR absorber or an UV absorber may not emit light having a visible wavelength when exposed to UV or IR light.

In some examples, the absorber may comprise or consist of a visible light absorber. As described above, an absorber which absorbs visible light may reflect coloured light which is not visible to a human eye. Therefore, a LEP ink composition or LEP image containing such an absorber may be considered to be colourless. An absorber which absorbs visible light may emit visible light. As described above, emitted visible light may be invisible to a human eye. In some examples, an absorber may absorb visible light and emit visible light at the same wavelength as the wavelength of the absorbed visible light. In some examples, an absorber may absorb visible light and emit visible light at the same wavelength as the wavelength of the absorbed visible light where absorption and emission occur at the same time. In some examples, an absorber may absorb visible light and emit visible light at the same wavelength as the wavelength of the absorbed visible light where absorption and emission occur at the same time and in the same direction (i.e. no scatter). Thus an absorber which absorbs and/or emits visible light may be invisible to the human eye. In some examples, a visible light absorber absorbs visible light having a particular range of wavelengths and reflects and/or emits visible light having a particular optical signal. The optical signal may be the reflectance spectrum of the visible light absorber following absorbance of the particular range of wavelengths, or a combination of the reflectance spectrum and the emission spectrum of the visible light absorber following absorbance of the particular range of wavelengths. In some examples, the optical signal may be the emission spectrum of the visible light absorber following absorbance of the particular range of wavelengths. In some example the optical signal may be a peak reflection and/or emission wavelength or peak reflection and/or emission wavelengths.

The absorber may be selected such that the LEP ink composition, or LEP image, is detectable at a selected optical signal, for example detectable at a selected IR, visible or UV optical signal (e.g. a selected IR, visible or UV wavelength). In some examples the absorber is selected, for example an IR absorber is selected, such that the LEP ink composition or LEP image is detectable at a selected IR optical signal. In some examples the absorber is selected, for example a visible absorber is selected, such that the LEP ink composition or LEP image is detectable at a selected visible optical signal. In some examples the absorber is selected, for example an UV absorber is selected, such that the LEP ink composition or LEP image is detectable at a selected UV optical signal. The optical signal at which the LEP ink composition or the LEP printed image is detectable may be determined by the absorption spectrum and/or the emission spectrum of the absorber contained in the LEP ink composition or LEP image. For example, the optical signal at which the LEP ink composition or LEP image may be detected may be determined by the spectrum of light (e.g. UV, visible or IR light) reflected and/or emitted by the LEP ink composition or LEP image comprising a particular absorber or combination of particular absorbers. For example, the absorber(s) may be selected to provide a LEP ink composition or LEP image providing a selected optical signal on exposure to radiation, for example on exposure to IR, UV and/or visible light. For example, the absorber(s) may be selected to provide a LEP ink composition or LEP image which provides a selected optical signal on exposure to a selected range of incident radiation, for example IR light, visible light or UV light. For example, the absorber(s) may be selected to provide a LEP ink composition or LEP image detectable at a selected optical signal, for example such that a detector is able to detect whether the selected optical signal is provided or not to identify whether a particular security image is present.

In some examples, the absorber is selected such that the LEP ink composition or LEP image absorbs a pre-selected radiation optical signal. In some examples, the absorber is selected such that the LEP ink composition or the LEP image absorbs a pre-selected radiation optical signal and emits and/or reflects a pre-selected radiation optical signal.

The selected optical signal at which the LEP ink composition or LEP image may be detectable may be referred to as a pre-selected optical signal. In some examples, the absorber or components of the absorber are modified in order to provide a LEP ink composition or LEP image which is detectable at a pre-selected optical signal in order that the LEP ink composition or a printed LEP image can be detected as well as being invisible to the human eye.

The absorber of the LEP ink composition or LEP image may comprise a plurality of absorbers, for example a first absorber and a second absorber, e.g. a first IR absorber and a second IR absorber, a first visible light absorber and a second visible light absorber, or a first UV absorber and a second UV absorber. The first absorber may have a different absorption spectrum to the absorption spectrum of the second absorber. For example, the LEP ink composition may comprise a first IR absorber characterised by a first absorption spectrum and a second IR absorber characterised by a second absorption spectrum where the first and second absorption spectrums are different. For example, the LEP ink composition may comprise a first UV absorber characterised by a first absorption spectrum and a second UV absorber characterised by a second absorption spectrum where the first and second absorption spectrums are different. For example, the LEP ink composition may comprise a first visible light absorber characterised by a first absorption spectrum and a second visible light absorber characterised by a second absorption spectrum where the first and second absorption spectrums are different.

In some examples, the absorber may comprise a plurality of absorbers, for example a first absorber and a second absorber. In some examples each of the plurality of absorbers have a different absorption spectrum and/or a different emission spectrum. The plurality of absorbers, e.g. the first absorber and the second absorber, may be selected such that the LEP ink composition, or LEP image, is detectable at a pre-selected optical signal, for example a pre-selected IR, visible or UV optical signal. In some examples, the plurality of absorbers is a plurality of IR absorbers, for example comprising a first IR absorber and a second IR absorber, such that the LEP ink composition or LEP image is detectable at a pre-selected IR optical signal. In some examples, the plurality of absorbers is a plurality of UV absorbers, for example comprising a first UV absorber and a second UV absorber, such that the LEP ink composition or LEP image is detectable at a pre-selected UV optical signal. In some examples, the plurality of absorbers is a plurality of visible light absorbers, for example comprising a first visible light absorber and a second visible light absorber, such that the LEP ink composition or LEP image is detectable at a pre-selected visible light optical signal. The optical signal at which the LEP ink composition comprising a plurality of absorbers, or the LEP printed image, is detectable may be determined by the superposed absorption spectrums of each of the plurality of absorbers. For example, the optical signal at which the LEP ink composition, or LEP image, comprising first and second IR absorbers is detectable may be determined by the superposed absorption spectrums of each of the first and second IR absorbers. For example, the plurality of absorbers may be selected to provide a LEP ink composition, or LEP image, having a peak reflectance and/or emission at a pre-selected wavelength (or reflectance or emission peaks at pre-selected wavelengths), for example such that a detector is able to detect whether a pre-selected optical signal is provided (via emission and/or reflectance) on exposure to the appropriate radiation. For example, first and second IR absorbers may be selected to provide a LEP ink composition, or LEP image, having a peak reflectance and/or emission at a pre-selected IR wavelength (or emission and/or reflectance peaks at pre-selected IR wavelengths), for example such that an IR detector is able to detect whether a pre-selected IR optical signal is provided (via emission and/or or reflectance) on exposure to IR light.

The optical signal at which the LEP ink composition comprising a plurality of absorbers, e.g. first and second absorbers, or the LEP printed image, is detectable may be tuned by altering the relative amount of each of the plurality of absorbers, e.g. altering the relative amount of the first and second absorber, contained in the LEP ink composition or LEP printed image. For example, altering the amount of the first and second absorbers to provide a LEP ink composition or printed image which is detectable at a selected optical signal. In some examples, the absorber may comprise a first absorber, a second absorber and a third absorber. In some examples each of the first, second and third absorber have a different absorption spectrum and/or a different emission spectrum.

The LEP ink composition may comprise a first absorber, a second absorber and a third absorber, e.g. a first IR absorber, a second IR absorber and a third IR absorber; a first visible light absorber, a second visible light absorber and a third visible light absorber; or a first UV absorber, a second UV absorber and a third UV absorber. The first, second and third absorbers may each have an absorption spectrum which is different from the absorption spectrum of each of the other of the first, second and third absorbers. The first, second and third absorbers may each have an emission spectrum which is different from the emission spectrum of each of the other of the first, second and third absorbers. The first, second and third absorbers may each have an absorption spectrum and/or an emission spectrum which is different from the absorption spectrum and/or the emission spectrum of each of the other of the first, second and third absorbers. The first, second and third absorbers may each be selected such that the LEP ink composition, or a printed image comprising the LEP ink composition, is detectable at a selected optical signal. The optical signal at which the LEP ink composition comprising a first, second and third absorber, or the LEP printed image, is detectable may be determined by the superposed absorption spectrums of the first absorber, the second absorber and the third absorber contained in the LEP ink composition. For example, the first, second and third absorbers may be selected to provide a LEP ink composition having a peak reflectance and/or emission at a selected wavelength (or emission and/or reflectance peaks at selected wavelengths), for example such that a detector is able to detect whether a selected optical signal is emitted and/or reflected by the LEP ink composition or LEP image on exposure to radiation.

The plurality of absorbers may be selected such that the LEP ink composition, or a printed image comprising the LEP ink composition, is detectable at a selected IR or UV optical signal.

In some examples, the absorber or each of the plurality of absorbers may comprise, consist essentially of, or consist of an oxide, sulfide, oxysulfide or combinations thereof. In some examples, the absorber or each of the plurality of absorbers may comprise, consist essentially of, or consist of a compound selected from the group comprising alkali metal oxides, sulfides and oxysulfides; alkaline earth metal oxides, sulfides and oxysulfides; transition metal oxides, sulfides and oxysulfides; rare earth oxides, sulfides and oxysulfides; and silicon oxides, sulfides and oxysulfides and combinations thereof. In some examples, the absorber or each of the plurality of absorbers may comprise, consist essentially of, or consist of rare earth oxides, sulfides, oxysulfides or combinations thereof. In some examples, the absorber or each of the plurality of absorbers may comprise, consist essentially of, or consist of a compound selected from the group comprising yttrium oxysulfide, titanium oxide, potassium sulfide, calcium sulfide, strontium sulfide, ytterbium oxysulfide, ytterbium oxide, lithium sulfide, gadolinium oxysulfide, niobium sulfide. The present inventors have found that such absorbers can be used to provide a LEP ink composition and/or to provide LEP images which are invisible to the human eye and also detectable at a selected optical signal.

The absorber(s) may be present in the LEP ink composition in an amount of from 10 wt % to 80 wt % of the total amount of solids in the LEP ink composition, in some examples 15 wt % to 80 wt %, in some examples 15 wt % to 60 wt %, in some examples 15 wt % to 50 wt %, in some examples 20 wt % to 45 wt %, in some examples 25 wt % to 40 wt % of the total amount of solids in the LEP ink composition.

Resin

The electrostatic ink composition includes a resin, which may be a thermoplastic resin. A thermoplastic polymer is sometimes referred to as a thermoplastic resin. The resin may coat the absorber(s). In some examples, the resin coats the absorber(s) such that particles are formed having a core of absorber and an outer layer of resin thereon. The outer layer of resin may coat the absorber(s) partially or completely.

In some examples, the electrostatic ink composition may comprise ink particles comprising an absorber(s) and a resin.

The resin generally includes a polymer. In some examples, the polymer of the resin may be selected from ethylene acrylic acid copolymers; ethylene methacrylic acid copolymers; ethylene vinyl acetate copolymers; copolymers of ethylene (e.g. 80 wt % to 99.9 wt %) and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

In some examples, the polymer is a copolymer of an alkylene monomer and a monomer having an acid side group. In some examples the alkylene monomer is an ethylene or a propylene monomer. In some examples, the monomer having an acid side group is an acrylic acid monomer or a methacrylic acid monomer. In some examples, the electrostatic ink composition comprises a polymer resin comprising a copolymer of an alkylene monomer and a monomer selected from acrylic acid and methacrylic acid.

The resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures, for example using the procedure described in ASTM D1386.

The resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes.

In some examples, the polymer having acid side groups has a melt flow rate of greater than about 120 g/10 minutes, in some examples greater than about 200 g/10 minutes, in some examples greater than about 300 g/10 minutes, in some examples greater than about 400 g/10 minutes. In some examples, the polymer having acid side groups has a melt flow rate of about 450 g/10 minutes.

In some examples, the polymer having acid side groups has a melt flow rate of less than about 500 g/10 minutes.

In some examples, the polymer having acid side groups has a melt flow rate in the range of about 150 g/10 minutes to about 600 g/10 minutes. In some examples, the polymer having acid side groups has a melt flow rate in the range of about 200 g/10 minutes to about 500 g/10 minutes.

In some examples, the polymer having acid side groups constitutes at least 50 wt. % of the resin, in some examples at least 60 wt. % in some examples at least 80 wt. %, in some examples at least 90 wt. %. In some examples, the polymer having acid side groups has a melt flow rate of greater than about 200 g/10 minutes, in some examples a melt flow rate of greater than about 200 g/10 minutes and up to about 500 g/10 minutes, and constitutes at least 50 wt. % of the resin, in some examples at least 60 wt. % in some examples at least 80 wt. %, in some examples at least 90 wt. %.

The melt flow rate can be measured using standard procedures, for example as described in ASTM D1238.

The acidic side groups may be in free acid form or may be in the form of an anion and associated with one or more counterions, generally metal counterions, e.g. a metal selected from the alkali metals, such as lithium, sodium and potassium, alkali earth metals, such as magnesium or calcium, and transition metals, such as zinc. The polymer having acidic side groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a copolymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the resins mentioned above, the ratio of the first polymer having acidic side groups to the second polymer having acidic side groups can be from about 10:1 to about 2:1. In another example, the ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and an example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid or methacrylic acid, wherein the ethylenically unsaturated acid of either acrylic or methacrylic acid constitutes from about 8 wt % to about 16 wt % of the copolymer, in some examples about 10 wt % to about 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from about 12 wt % to about 30 wt % of the copolymer, in some examples from about 14 wt % to about 20 wt % of the copolymer, in some examples from about 16 wt % to about 20 wt % of the copolymer in some examples from about 17 wt % to about 19 wt % of the copolymer.

In some examples, the resin essentially consists of a copolymer of ethylene and methacrylic acid. In some examples the methacrylic acid of the copolymer of ethylene and methacrylic acid constitutes about 8 wt % to about 12 wt % of the copolymer, in some examples about 9 wt % to about 11 wt % of the copolymer, in some examples about 10 wt. % of the copolymer. In an example, the resin constitutes about 5 to about 90%, in some examples about 5 to about 80%, by weight of the solids of the electrostatic ink composition. In another example, the resin constitutes about 10 to about 60% by weight of the solids of the electrostatic ink composition. In another example, the resin constitutes about 15 to about 40% by weight of the solids of the electrostatic ink composition. In another example, the resin constitutes about 60 to about 95% by weight, in some examples from about 80 to about 90% by weight, of the solids of the electrostatic ink composition.

The resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, for example, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute about 1 to about 50% by weight of the co-polymer, in some examples about 5 to about 40% by weight, in some examples 5 about to about 20% by weight of the copolymer, in some examples about 5 to about 15% by weight of the copolymer. The second monomer may constitute about 1 to about 50% by weight of the co-polymer, in some examples about 5 to about 40% by weight of the co-polymer, in some examples about 5 to about 20% by weight of the co-polymer, in some examples about 5 to about 15% by weight of the copolymer. In an example, the first monomer constitutes about 5 to about 40% by weight of the co-polymer, the second monomer constitutes about 5 to about 40% by weight of the co-polymer, and with the third monomer constituting the remaining weight of the copolymer. In an example, the first monomer constitutes about 5 to about 15% by weight of the co-polymer, the second monomer constitutes about 5 to about 15% by weight of the co-polymer, with the third monomer constituting the remaining weight of the copolymer. In an example, the first monomer constitutes about 8 to about 12% by weight of the co-polymer, the second monomer constitutes about 8 to about 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute about 1% or more by weight of the total amount of the resin polymers in the resin, e.g. the total amount of the polymer or polymers having acidic side groups and polymer having ester side groups. The polymer having ester side groups may constitute about 5% or more by weight of the total amount of the resin polymers in the resin, in some examples about 8% or more by weight of the total amount of the resin polymers in the resin, in some examples about 10% or more by weight of the total amount of the resin polymers in the resin, in some examples about 15% or more by weight of the total amount of the resin polymers in the resin, in some examples about 20% or more by weight of the total amount of the resin polymers in the resin, in some examples about 25% or more by weight of the total amount of the resin polymers in the resin, in some examples about 30% or more by weight of the total amount of the resin polymers in the resin, in some examples about 35% or more by weight of the total amount of the resin polymers in the resin. The polymer having ester side groups may constitute from about 5% to about 50% by weight of the total amount of the resin polymers in the resin, in some examples about 10% to about 40% by weight of the total amount of the resin polymers in the resin, in some examples about 15% to about 30% by weight of the total amount of the polymers in the resin.

The polymer having ester side groups may have an acidity of 50 mg KOH/g or more, in some examples an acidity of about 60 mg KOH/g or more, in some examples an acidity of about 70 mg KOH/g or more, in some examples an acidity of about 80 mg KOH/g or more. The polymer having ester side groups may have an acidity of about 100 mg KOH/g or less, in some examples about 90 mg KOH/g or less. The polymer having ester side groups may have an acidity of about 60 mg KOH/g to about 90 mg KOH/g, in some examples about 70 mg KOH/g to about 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers of the resin can be selected from the Nucrel family of resins (e.g. Nucrel403™, Nucrel 407™, Nucrel 609HS™, Nucrel 908HS™, Nucrel1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of resins (e.g. Aaclyn 201, Aclyn 246, Aclyn 285, and Aclyn 295), and the Lotader family of resins (e.g. Lotader 2210, Lotader, 3430, and Lotader 8200 (sold by Arkema)).

In some examples, the absorber(s) constitutes a certain wt %, e.g. from about 1 wt %, to about 60 wt %, in some examples from about 20 wt. % to about 50 wt. %, of the solids of the electrostatic ink composition, and the remaining wt % of the solids of the electrostatic ink composition is formed by the resin and, in some examples, any other additives that are present. The other additives may constitute about 10 wt % or less of the solids of the electrostatic ink composition, in some examples about 5 wt % or less of the solids of the electrostatic ink composition, in some examples about 3 wt % or less of the solids of the electrostatic ink composition. In some examples, the resin may constitute about 5% to about 99% by weight of the solids in the electrostatic ink composition, in some examples about 50% to about 90% by weight of the solids of the electrostatic ink composition, in some examples about 70% to about 90% by weight of the solids of the electrostatic ink composition. The remaining wt % of the solids in the ink composition may be an absorber(s) and, in some examples, any other additives that may be present.

Carrier Liquid

The LEP ink composition includes a liquid carrier. In some examples, the LEP ink composition comprises ink particles including the resin which may be dispersed in the liquid carrier. The liquid carrier can include or be a hydrocarbon, silicone oil, vegetable oil, etc. The liquid carrier can include, for example, an insulating, non-polar, non-aqueous liquid that can be used as a medium for ink particles, i.e. the ink particles including the resin and, in some examples, an absorber(s). The liquid carrier can include compounds that have a resistivity in excess of about $10^9$ ohm·cm. The liquid carrier may have a dielectric constant below about 5, in some examples below about 3. The liquid carrier can include hydrocarbons. The hydrocarbon can include, for example, aliphatic hydrocarbons, isomerized aliphatic hydrocarbons, branched chain aliphatic hydrocarbons, aromatic hydrocarbons, and combinations thereof. Examples of the liquid carriers include, for example, aliphatic hydrocarbons, isoparaffinic compounds, paraffinic compounds, dearomatized hydrocarbon compounds, and the like. In particular, the liquid carriers can include, for example, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™)

The liquid carrier can constitute about 20% to about 99.5% by weight of the LEP ink composition, in some examples about 50% to about 99.5% by weight of the LEP ink composition. The liquid carrier may constitute about 40 to about 90% by weight of the LEP ink composition. The liquid carrier may constitute about 60% to about 80% by weight of the LEP ink composition. The liquid carrier may constitute about 90% to about 99.5% by weight of the LEP ink composition, in some examples about 95% to about 99% by weight of the LEP ink composition.

The liquid electrostatic ink composition, when printed on a print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than about 5 wt % liquid carrier, in some examples, less than about 2 wt % liquid carrier, in some examples less than about 1 wt % liquid carrier, in some examples less than about 0.5 wt % liquid carrier.

In some examples, the ink printed on the print substrate is free from liquid carrier.

Charge Director

In some examples, the LEP ink composition includes a charge director. The charge director may be added to a LEP ink composition in order to impart and/or maintain sufficient electrostatic charge on the ink particles. In some examples, the charge director may comprise ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, for example, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, for example, barium, sodium, calcium, and aluminium salts of sulfonic acid. The sulfonic acids may include, for example, alkyl sulfonic acids, aryl sulfonic acids, and sulfonic acids of alkyl succinates. The charge director can impart a negative charge or a positive charge on the resin-containing particles of a LEP ink composition.

The charge director may be added in order to impart and/or maintain sufficient electrostatic charge on the ink particles, which may be particles comprising the thermoplastic resin.

In some examples, the LEP ink composition comprises a charge director comprising a simple salt. The ions constructing the simple salts are all hydrophilic. The simple salt may include a cation selected from the group consisting of Mg, Ca, Ba, NHa, tert-butyl ammonium, Li$^+$, and Al$^{+3}$, or from any sub-group thereof. The simple salt may include an anion selected from the group consisting of $SO_4^{2-}$, $PO^{3-}$, $NO_3^-$, $HPO_4^{2-}$, $CO_3^{2-}$, acetate, trifluoroacetate (TFA), Cl$^-$, $BF_4^-$, F$^-$, $ClO_4^-$, and $TiO_3^{4-}$ or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, LiTFA, $Al_2(SO_4)_3$, $LiClO_4$ and $LiBF_4$, or any sub-group thereof.

In some examples, the LEP ink composition comprises a charge director comprising a sulfosuccinate salt of the general formula $MA_n$, wherein M is a metal, n is the valence of M, and A is an ion of the general formula (I): [$R^1$—O—C(O)CH$_2$CH(SO$_3^-$)C(O)—O—R$^2$], wherein each of R$^1$ and R$^2$ is an alkyl group. In some examples each of R$^1$ and R$^2$ is an aliphatic alkyl group. In some examples, each of R$^1$ and R$^2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, R$^1$ and R$^2$ are the same. In some examples, at least one of R$^1$ and R$^2$ is $C_{13}H_{27}$. In some examples, M is Na, K, Cs, Ca, or Ba.

In some examples, the charge director comprises at least one micelle forming salt and nanoparticles of a simple salt as described above. The simple salts are salts that do not form micelles by themselves, although they may form a core for micelles with a micelle forming salt. The sulfosuccinate salt of the general formula $MA_n$ is an example of a micelle forming salt. The charge director may be substantially free of an acid of the general formula HA, where A is as described above. The charge director may include micelles of said sulfosuccinate salt enclosing at least some of the nanoparticles of the simple salt. The charge director may include at least some nanoparticles of the simple salt having a size of 200 nm or less, and/or in some examples 2 nm or more.

The charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to about 20%, in some examples about 0.01% to about 20% by weight, in some examples about 0.01 to about 10% by weight, in some examples about 0.01% to about 1% by weight of the solids of a LEP ink composition. In some examples, the charge director constitutes about 0.001% to about 0.15% by weight of the solids of the LEP ink composition, in some examples about 0.001% to about 0.15%, in some examples about 0.001% to about 0.02% by weight of the solids of a LEP ink composition, in some examples about 0.1% to about 2% by weight of the solids of the LEP ink composition, in some examples about 0.2% to about 1.5% by weight of the solids of the LEP ink composition in some examples about 0.1% to about 1% by weight of the solids of the LEP ink composition, in some examples about 0.2% to about 0.8% by weight of the solids of the LEP ink composition.

In some examples, the charge director is present in an amount of from about 3 mg/g to about 80 mg/g, in some examples 3 mg/g to about 50 mg/g, in some examples 3 mg/g to about 20 mg/g, in some examples from about 3 mg/g to about 15 mg/g, in some examples from about 10 mg/g to about 15 mg/g, in some examples from about 5 mg/g to about 10 mg/g (where mg/g indicates mg per gram of solids of the LEP ink composition).

Other Additives

The LEP ink composition may include another additive or a plurality of other additives. The other additive or plurality of other additives may be added at any stage of the method. The other additive or plurality of other additives may be selected from a charge adjuvant, a wax, a surfactant, viscosity modifiers, and compatibility additives. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

In some examples, the LEP ink composition includes a charge adjuvant. A charge adjuvant may promote charging of the particles when a charge director is present. The method as described herein may involve adding a charge adjuvant at any stage. The charge adjuvant can include, for example, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. In some examples, the charge adjuvant is VCA (an aluminium stearate, available from Sigma Aldrich).

The charge adjuvant may be present in an amount of about 0.1 to about 5% by weight, in some examples about 0.1 to about 1% by weight, in some examples about 0.3 to about 0.8% by weight of the solids of the LEP ink composition, in some examples about 1 wt % to about 3 wt % of the solids of the LEP ink composition, in some examples about 1.5 wt % to about 2.5 wt % of the solids of the LEP ink composition.

The charge adjuvant may be present in an amount of less than about 5.0% by weight of total solids of the LEP ink composition, in some examples in an amount of less than about 4.5% by weight, in some examples in an amount of less than about 4.0% by weight, in some examples in an amount of less than about 3.5% by weight, in some examples in an amount of less than about 3.0% by weight, in some examples in an amount of less than about 2.5% by weight, in some examples about 2.0% or less by weight of the solids of the LEP ink composition.

In some examples, the LEP ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is $Al^{3+}$. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of a multivalent cation and a fatty acid anion, may be present in an amount of about 0.1 wt % to about 5 wt % of the solids of the LEP ink composition, in some examples in an amount of about 0.1 wt % to about 2 wt % of the solids of the LEP ink composition, in some examples in an amount of about 0.1 wt % to about 2 wt % of the solids of the LEP ink composition, in some examples in an amount of about 0.3 wt % to about 1.5 wt % of the solids of the LEP ink composition, in some examples about 0.5 wt % to about 1.2 wt % of the solids of the LEP ink composition, in some examples about 0.8 wt % to about 1 wt % of the solids of the LEP ink composition, in some examples about 1 wt % to about 3 wt % of the solids of the LEP ink composition, in some examples about 1.5 wt % to about 2.5 wt % of the solids of the LEP ink composition.

Method for Producing a LEP Ink Composition

Also provided is a method of providing a security LEP ink. The method may comprise:

selecting an absorber; and combining the absorber with a resin and a carrier liquid.

As discussed above, the absorber may be colourless. As discussed above, the LEP ink composition may be invisible to the human eye and detectable at a selected optical signal, for example the LEP ink composition may be colourless and transparent.

The method may comprise selecting an absorber having an absorption spectrum such that the LEP ink composition or the LEP printed image is detectable at a selected optical signal. In some examples, the method comprises selecting an absorber having an absorption spectrum and/or an emission spectrum such that the LEP ink or the LEP printed image is detectable at a selected optical signal.

In some examples, the method comprises selecting an absorber having an absorption spectrum such that the LEP ink composition or LEP printed image absorbs radiation having a pre-selected wavelength (e.g. wavelength range). In some examples, the method comprises selecting an absorber having an absorption spectrum such that the LEP ink composition or LEP printed image absorbs radiation having a pre-selected wavelength and reflects radiation having a pre-selected optical signal. In some examples, the method comprises selecting an absorber having an absorption spectrum such that the LEP ink composition or LEP printed image absorbs radiation having a pre-selected wavelength and reflects and/or emits radiation having a pre-selected optical signal. In some examples, the method comprises selecting an absorber having an absorption spectrum such that the LEP ink composition or LEP printed image absorbs radiation having a pre-selected wavelength and an emission spectrum such that the LEP ink composition or LEP printed image emits radiation having a pre-selected optical signal.

In some examples the method of providing a LEP ink composition comprises combining a resin and an absorber, e.g. a first absorber, to form ink particles and dispersing the ink particles in a carrier liquid to form an electrostatic ink composition.

In some examples, the method of providing a LEP composition comprises selecting a plurality of absorbers, each of the plurality of absorbers having a different absorption spectrum and/or emission spectrum to each of the other of the plurality of absorbers such that the LEP ink or the LEP printed image is detectable at a pre-selected optical signal and/or absorbs radiation at a pre-selected wavelength.

In some examples, the method of providing a LEP composition comprises selecting a first absorber having a first absorption spectrum and a second absorber having a second absorption spectrum such that the LEP ink or the LEP printed image is detectable at a pre-selected optical signal. In some examples, the method of providing a LEP composition comprises selecting a first absorber having a first absorption spectrum and a second absorber having a second absorption spectrum such that the LEP ink or the LEP printed image absorbs a pre-selected wavelength of radiation.

In some examples, the method of providing a LEP ink composition comprises combining a resin, and a plurality of absorbers, e.g. a first absorber and a second absorber, to form ink particles and dispersing the ink particles in a carrier liquid to form a LEP ink composition.

In some examples, the method of providing a LEP ink composition comprises combining a resin and a first absorber to form first ink particles and then combining a resin and a second absorber to form second ink particles. In some examples the method comprises dispersing the first ink particles and the second ink particles in a carrier liquid for form a LEP ink composition. In some examples the method comprises dispersing the first ink particles in a carrier liquid to form a first precursor LEP ink composition and dispersing the second ink particles in a carrier liquid for form a second precursor LEP ink composition. In some examples the first precursor LEP ink composition and the second precursor LEP ink composition may be combined to form a LEP ink composition which is detectable or forms LEP printed images which are detectable at a selected optical signal. In some example, the optical signal at which the LEP composition is detectable may be selected by combining the first and second precursor LEP ink compositions such that the LEP ink composition comprises a ratio of first absorber to second absorber to provide the LEP ink composition or a printed image thereof which has an absorbance spectrum so as to be detectable at a selected optical signal. In some examples, the optical signal at which the LEP ink composition or LEP image is detectable may be selected by combining the first and second precursor LEP ink compositions such that the LEP ink composition comprises a ratio of first absorber to second absorber to provide the LEP ink composition or a printed image thereof which has an emission spectrum so as to be detectable at a selected optical signal. In some examples, the wavelength at which the LEP ink composition or LEP image absorbs may be selected by combining the first and second precursor LEP ink compositions such that the LEP ink composition comprises a ratio of first absorber to second absorber to provide the LEP ink composition or a printed image thereof which has an absorption spectrum so as to absorb radiation at a selected wavelength (e.g. absorbs radiation over a selected range of wavelengths).

In some examples, the method of providing a LEP ink composition comprises combining a plurality of precursor LEP ink compositions, each of the plurality of precursor LEP ink compositions comprising an absorber having a different absorption spectrum and/or emission spectrum from an absorber in each of the other of the plurality of precursor LEP ink compositions. In some examples, the absorption spectrum and/or emission spectrum of the LEP ink composition can be tuned, such that the LEP ink composition or LEP image is detectable at a selected optical signal, by controlling the ratio in which the plurality of precursor LEP ink composition are combined.

In some examples, forming the ink particles comprises grinding the resin and absorber(s) in the presence of a carrier liquid. In some examples, the resin and absorber(s) are ground in the present of a carrier liquid and a charge adjuvant such as VCA. In some examples, additional carrier liquid may then be added to the composition. In some examples, the method comprises adding a charge director to the composition comprising ink particles dispersed in a carrier liquid.

Printing Process and Print Substrate

Also provided is a method for printing security information. The method may comprise:

providing a security LEP ink composition comprising:
an absorber;
a resin; and
a carrier liquid; and
liquid electrophotographically printing the selected LEP ink onto a print substrate to provide a LEP image on the print substrate.

The security LEP ink may be selected such that the printed LEP image is detectable at a selected optical signal. As discussed above, a security LEP ink may be invisible to the human eye, e.g. colourless and transparent, for example when viewed under visible, UV and/or IR light.

The LEP ink composition, or a set of LEP ink compositions (for example a set of precursor LEP ink compositions) may be as described above.

In some examples, the method may comprise printing a plurality of different LEP ink compositions, e.g. a set of LEP ink compositions, to form an image on a print substrate, the image being detectable at a selected optical signal. Each of the plurality of different LEP ink compositions may comprise a different absorber or a different combination of absorbers, and/or a combination of absorbers in different amounts. Each of the different absorbers may have a different absorption spectrum and/or emission spectrum compared to each of the other absorbers.

The method may comprise selecting an optical signal at which the LEP image is to be detected.

The method may comprise selecting a wavelength at which the LEP image is to absorb radiation.

The method may comprise selecting a LEP ink composition or a combination of LEP ink compositions, e.g. a set of LEP ink compositions or precursor LEP ink compositions as described above, to provide a printed LEP image which is detectable at the selected optical signal.

In examples in which one LEP ink composition is selected to provide a printed image detectable at the selected optical signal, the method of printing may comprise liquid electrophotographically printing the selected LEP ink onto a print substrate to provide a LEP image on the print substrate which is detectable at the selected optical signal. In some examples, a plurality of LEP images may be printed on top of one another on the substrate, each image formed from the one LEP ink composition.

In examples in which a combination of LEP ink compositions, e.g. a set of LEP ink compositions, such as a set of precursor LEP ink compositions as described above, is selected to provide a printed image which is detectable at the selected optical signal, the method of printing may comprise liquid electrophotographically printing each of the LEP ink compositions of the combination or set of LEP ink compositions on to the print substrate to provide a final security LEP image on the print substrate comprising a plurality of LEP images, each formed of one of the LEP ink compositions from the set of LEP ink compositions. The LEP image on the print substrate may have a layered structure comprising a layer of each of the LEP ink compositions, or may comprise a number of areas of different LEP ink compositions. In these examples, the optical signal at which the LEP image is detectable is the resulting optical signal from the superposition of the absorption spectrum and/or the emission spectrum of each of the LEP images forming the final security LEP image. In some examples, the thickness of each layer of LEP image making up the final security image may be controlled to select the optical signal at which the LEP image is detectable and/or the wavelength at which the LEP image absorbs radiation. In some examples, the concentration of the absorber of each of the LEP ink compositions making up the LEP image may be controlled to select the optical signal at which the LEP image is detectable and/or the wavelength at which the LEP image absorbs radiation.

The method for printing security information may comprise:

providing a liquid electrostatic ink composition as described herein;
contacting the electrostatic ink composition with a latent electrostatic image on a surface to create a developed image; and
transferring the developed image to a print substrate, in some examples via an intermediate transfer member.

In some examples, the surface on which the (latent) electrostatic image is formed or developed may be a rotating member, e.g. in the form of a cylinder. The surface on which the (latent) electrostatic image is formed or developed may form part of a photo imaging plate (PIP). The method may involve passing the electrostatic ink composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from about 80 to about 160° C.

The present disclosure also provides a LEP ink composition producible according to the method described herein. There may also be provided a print substrate having printed thereon a LEP ink composition as described herein and/or producible according to the method described herein.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, for example, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), and mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print substrate. In some examples, a primer may be coated onto the print substrate, before the electrostatic ink composition is printed onto the print substrate.

The FIGURE shows a schematic illustration of a Liquid Electro Photographic (LEP) printing apparatus which may be used to print a LEP ink composition as described herein. An image, including any combination of graphics, text and images, may be communicated to the LEP printing apparatus 1. According to an illustrative example, in order to print the electrostatic ink composition, firstly, the photo charging unit 2 deposits a uniform static charge on the photo-imaging cylinder 4 and then a laser imaging portion 3 of the photo charging unit 2 dissipates the static charges in selected portions of the image area on the photo-imaging cylinder 4 to leave a latent electrostatic image. The latent electrostatic image is an electrostatic charge pattern representing the image to be printed. The electrostatic ink composition is then transferred to the photo-imaging cylinder 4 by Binary Ink Developer (BID) unit 6. The BID unit 6 presents a uniform film of the electrostatic ink composition to the photo-imaging cylinder 4. A resin component of the electrostatic ink composition may be electrically charged by virtue of an appropriate potential applied to the electrostatic ink composition in the BID unit. The charged resin component, by virtue of an appropriate potential on the electrostatic image areas, is attracted to the latent electrostatic image on the photo-imaging cylinder 4 (first transfer). The LEP ink composition does not adhere to the uncharged, non-image areas and forms an image on the surface of the latent electrostatic image. The photo-imaging cylinder 4 then has a developed electrostatic ink composition image on its surface.

The image is then transferred from the photo-imaging cylinder 4 to the intermediate transfer member (ITM) 8 by virtue of an appropriate potential applied between the photo-imaging cylinder 4 and the ITM 8, such that the charged electrostatic ink composition is attracted to the ITM 8 (second transfer). The image is then dried and fused on the ITM 8 before being transferred to a print substrate 10.

Between the first and second transfers the solid content of the LEP ink composition image is increased and the LEP ink composition is fused on to the ITM 8. For example, the solid content of the LEP ink composition image deposited on the ITM 8 after the first transfer is generally around 20%, by the second transfer the solid content of the image is generally around 80-90%. This drying and fusing is generally achieved by using elevated temperatures and air flow assisted drying. In some examples, the ITM 8 is heatable.

In the example described above, the LEP image printed on the print substrate comprises one LEP image formed in one LEP ink composition. The thickness of the final security LEP image may be increased by printing additional LEP images on top of the first LEP image. Controlling the thickness of the LEP image also controls the amount of absorber in the LEP image. Therefore, controlling the thickness of the LEP image may allow the wavelength at which the LEP image absorbs radiation as well as the optical signal at which the final security LEP image may be detected to be controlled. Therefore, in some examples the method comprises controlling the thickness of the LEP image. For example, the method may comprise printing a plurality of LEP ink compositions, for example each of the plurality of LEP ink compositions comprising different absorbers, combinations of absorbers or amounts of absorbers, and controlling the thickness of each LEP image printed using each of the plurality of LEP ink compositions.

EXAMPLES

The following illustrates examples of the compositions and related aspects described herein. Thus, these examples should not be considered to restrict the present disclosure, but are merely in place to teach how to make examples of compositions of the present disclosure.

Materials

Resins:

Nucrel® 699 (Dupont): a copolymer of ethylene and methacrylic acid, made with nominally 11 wt % methacrylic acid.

AC-5120 (Honeywell): ethylene—acrylic acid copolymer with an acid number of 112-130 KOH/g.

Carrier Liquid:

Isopar L (available form EXXON): an isoparafinic oil.

Charge Adjuvant:

VCA (available from Sigma-Aldrich): an aluminium stearate.

Charge Director:

NCD: a natural charge director having the components (i) natural soya lecithin, (ii) basic barium petronate, and (iii) dodecyl benzene sulphonic acid, amine salt, with the components (i), (ii) and (iii) being present in the weight ratios of 6.6%:9.8:3.6%.

Absorbers:

Rm18 and Rm36 (available from Stardust Materials—http://www.stardustus.com) are both IR absorbers, which absorb light with wavelengths in the range of 820-980 nm and emit IR light having a wavelength of 890-1040 nm.

Am15 (available from Stardust Materials—http://www.stardustus.com) an IR absorber, which absorbs light with wavelengths in the range of 930-950 nm and emits IR light having a wavelength of 970-1020 nm.

Pm76 and Pm78 (available from Stardust Materials—http://www.stardustus.com): are both visible light absorbers, which absorb light with wavelengths in the range of 450-460 nm and emit visible light having a wavelength of 630-650 nm.

Standard Procedure

A paste was formed by mixing the resins Nucrel 699 and AC-5120 (ratio of 4:1) at 40 wt. % NVS in the presence of a carrier liquid (Isopar L) in a Ross mixer (Model DPM-2, obtained from Charles Ross & Son Company—Hauppauge N.Y.) at 120-150° C. and 50 rpm for 90 min., and then the RPM was raised to 70 for 120 min. Subsequently, the temperature was lowered to room temperature and, after 30 min, the RPM was lowered to 50. A paste was obtained.

An absorber was ground with the paste at a ratio of 1:5 (absorber:paste) by weight for 8 h in the presence of 2 wt. % VCA in a ceramic attritor (Union Process Attritor system—a batch-type Szegvari attritor system with a mill size of 1 gallon), without any prior treatment. The overall amount of material in the attritor system was 1700 g and the attritor was used at 26° C. and 250 rpm.

The ground material was then diluted with Isopar L to form a 2 wt. % NVS working dispersion.

Example 1

A liquid electrophotographic (LEP) ink (Ink 1) was formulated using Rm18 as the IR absorber in the general procedure described above and NCD was added in an amount of 50 mg/g LEP ink composition.

Example 2

A liquid electrophotographic (LEP) ink (Ink 2) was formulated using Rm36 as the IR absorber in the general procedure described above and NCD was added in an amount of 50 mg/g LEP ink composition.

Example 3

A liquid electrophotographic (LEP) ink (Ink 3) was formulated using Am15 as the IR absorber in the general procedure described above and NCD was added in an amount of 50 mg/g LEP ink composition.

Example 4

A liquid electrophotographic (LEP) ink (Ink 4) was formulated using Pm76 as the visible absorber in the general procedure described above and NCD was added in an amount of 50 mg/g LEP ink composition.

Example 5

A liquid electrophotographic (LEP) ink (Ink 5) was formulated by using Pm78 as the visible absorber in the general procedure described above and NCD was added in an amount of 50 mg/g LEP ink composition.

Examples 6-14

Liquid electrophotographic (LEP) inks were formulated by combining a first ink with a second ink in a particular ratio (i.e. Inks 1-5 above were used as precursor LEP ink compositions), as shown in table 1 below.

Each of the liquid electrophotographic inks produced in Examples 1-14 was printed onto standard paper using an Indigo 6000 or 7000 series LEP printing press. Each of the LEP ink compositions was printed to have a thickness of about 1 μm. Once printed, the ink formulations were invisible to the human eye when viewed under IR, visible or UV light.

A detector was used to determine the optical signal provided by each of the LEP images provided using the LEP ink compositions of Examples 1-14 described in table 1 below by measuring the intensity and wavelength of light reflected and/or emitted from each of the LEP images on exposure to IR or visible light.

TABLE 1

| Example | First ink | Second Ink | Ratio of $1^{st}$ to $2^{nd}$ ink | Detected signal |
|---|---|---|---|---|
| 1 | Ink 1 | — | — | A |
| 2 | Ink 2 | — | — | B |
| 3 | Ink 3 | — | — | C |
| 4 | Ink 4 | — | — | D |
| 5 | Ink 5 | — | — | E |
| 6 | Ink 1 | Ink 2 | 7:3 | F |
| 7 | Ink 1 | Ink 2 | 1:1 | G |
| 8 | Ink 1 | Ink 3 | 4:1 | H |
| 9 | Ink 1 | Ink 3 | 1:1 | I |
| 10 | Ink 2 | Ink 3 | 2:5 | J |
| 11 | Ink 2 | Ink 3 | 1:1 | K |
| 12 | Ink 4 | Ink 5 | 1:1 | L |
| 13 | Ink 4 | Ink 5 | 3:7 | M |
| 14 | Ink 4 | Ink 5 | 7:3 | N |

Each of the LEP images printed using the LEP ink composition of Examples 1-11 was found to emit and/or reflect light having an IR optical signal indicated as signals A-K in Table 1, where the optical signal at which each LEP image provided by each LEP ink composition was detected was dependent on the IR absorber(s) contained in the LEP ink composition and/or the relative amounts of the first IR absorber and second IR absorber (i.e. corresponding to the ratio of the amount of first ink (containing the first absorber) to second ink (containing the second absorber)) with respect to one another, when exposed to IR light.

Each of the LEP images printed using the LEP ink composition of Examples 12-14 were found to emit and/or reflect light having an optical signal within the visible wavelength range indicated as signals L-N in Table 1 where the optical signal at which each LEP image provided by each LEP ink composition was detected was dependent on the visible light absorber(s) and/or the relative amounts of the first visible light absorber and second visible light absorber (i.e. corresponding to the ratio of the amount of first ink (containing the first absorber) to second ink (containing the second absorber)) with respect to one another, when exposed to visible light.

Each of the optical signals A-N detected when each of the LEP images printed using the LEP ink compositions of Examples 1-14 were exposed to IR light/visible light was particular to the particular LEP ink composition. Therefore, detection of such a signal allows a particular security LEP image to be identified using an appropriate detector while being invisible to the human eye. Therefore, the exemplified LEP compositions can be used to print a security image which is invisible to the human eye but allows a LEP image to be identified at a pre-selected optical signal, for example by exposing the LEP image to an appropriate wavelength of light (e.g. IR light or a particular range of IR wavelengths) and detecting a pre-selected optical signal of the reflected and/or emitted light (e.g. a particular IR wavelength range, or peak IR wavelengths).

While the LEP ink compositions, methods and related aspects have been described with reference to certain examples, it will be appreciated that various modifications, changes, omissions, and substitutions can be made without departing from the spirit of the disclosure. It is intended, therefore, that the LEP ink compositions, methods and related aspects be defined by the scope of the following claims. Unless otherwise stated, the features of any dependent claim can be combined with the features of any of the other dependent claims, and any other independent claim.

The invention claimed is:

1. A security liquid electrophotographic (LEP) ink composition comprising:

a first absorber;
a second absorber;
a resin; and
a carrier liquid,
wherein the LEP ink is colourless and transparent; wherein the first absorber and second absorber have absorption spectra in the infrared (IR) range; wherein the first absorber and second absorber have emission spectra in the IR range; wherein the first absorber and second absorber have different absorption spectra, different emission spectra, or both; wherein the LEP ink composition is detectable at an optical signal comprising a superposition of the absorption spectra of the first and second absorbers or a superposition of the emission spectra of the first and second absorbers; and wherein the first and second absorbers comprise an oxide, oxysulfide, sulfide, or combinations thereof.

2. An LEP ink composition according to claim 1, wherein a ratio of the amount of first absorber to the amount of second absorber is selected such that the LEP ink composition is detectable at the optical signal.

3. An LEP ink composition according to claim 2, wherein the ratio is from 1:4 to 4:1.

4. An LEP ink composition according to claim 1, wherein the first and second absorbers comprise a compound selected from the group consisting of alkali metal oxides, alkali metal sulfides, alkali metal oxysulfides, alkaline earth metal oxides, alkaline earth metal sulfides, alkaline earth metal oxysulfides, transition metal oxides, transition metal sulfides, transition metal oxysulfides, rare earth oxides, rare earth sulfides, rare earth oxysulfides, silicon oxides, silicon sulfides, silicon oxysulfides, and combinations thereof.

5. An LEP ink composition according to claim 1, wherein the first and second absorbers comprise a compound selected from the group consisting of yttrium oxysulfide, potassium sulfide, calcium sulfide, strontium sulfide, ytterbium oxysulfide, ytterbium oxide, lithium sulfide, gadolinium oxysulfide, niobium sulfide, and combinations thereof.

6. An LEP ink composition according to claim 1, wherein the first absorber and second absorber are present in a total amount of 15 wt % to 50 wt % of the total solids in the LEP ink composition.

7. An LEP ink composition according to claim 1, wherein the first absorber and second absorber have absorption spectra in the range of 820-980 nm and emission spectra in the range of 890-1040 nm.

8. A method for printing security information, the method comprising:
providing the LEP ink composition of claim 1; and
liquid electrophotographically printing the LEP ink composition onto a print substrate to provide a LEP image on the print substrate which is invisible to the human eye.

9. A method according to claim 8, wherein a ratio of the amount of first absorber to the amount of second absorber is selected such that the LEP ink composition is detectable at the optical signal.

10. A method according to claim 8, wherein the first and second absorbers comprise a compound selected from the group consisting of alkali metal oxides, alkali metal sulfides, alkali metal oxysulfides, alkaline earth metal oxides, alkaline earth metal sulfides, alkaline earth metal oxysulfides, transition metal oxides, transition metal sulfides, transition metal oxysulfides, rare earth oxides, rare earth sulfides, rare earth oxysulfides, silicon oxides, silicon sulfides, silicon oxysulfides, and combinations thereof.

11. A method according to claim 8, wherein the first and second absorbers comprise a compound selected from the group consisting of yttrium oxysulfide, potassium sulfide, calcium sulfide, strontium sulfide, ytterbium oxysulfide, ytterbium oxide, lithium sulfide, gadolinium oxysulfide, niobium sulfide, and combinations thereof.

* * * * *